July 5, 1938.  L. A. ELMER  2,122,458

FILM SPROCKET

Filed June 30, 1936   3 Sheets-Sheet 1

INVENTOR
L. A. ELMER
BY
*g. H. Heydt*
ATTORNEY

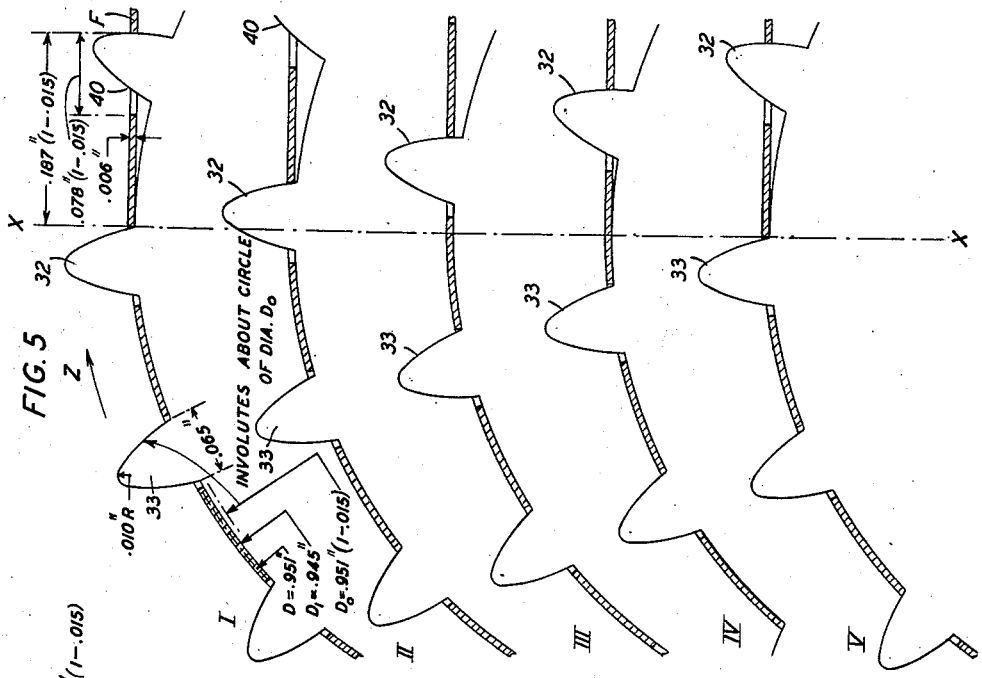
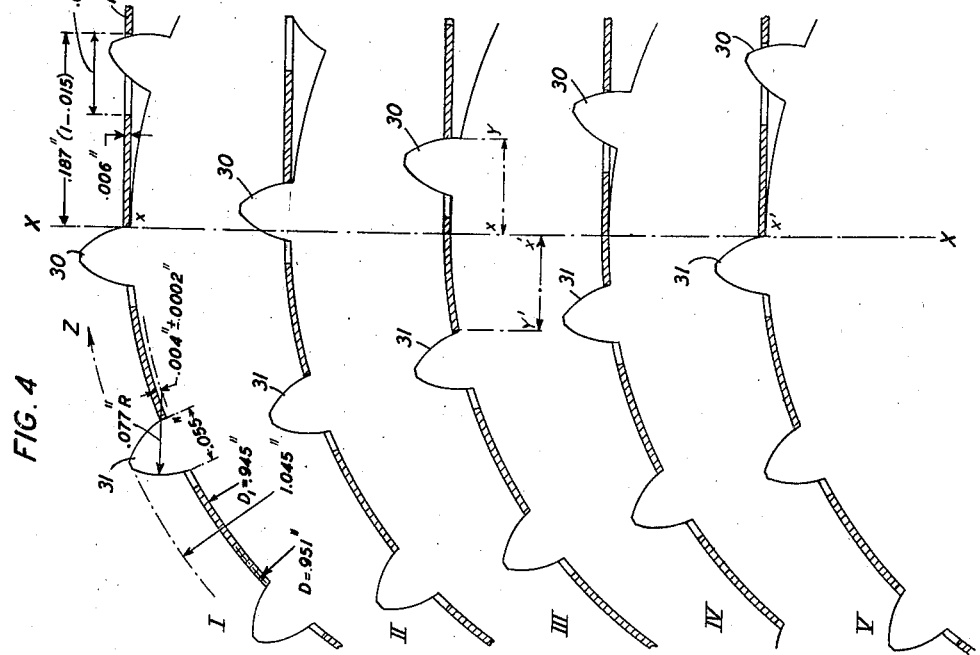

July 5, 1938.  L. A. ELMER  2,122,458

FILM SPROCKET

Filed June 30, 1936  3 Sheets-Sheet 3

INVENTOR
L. A. ELMER
BY
*G. H. Heydt*
ATTORNEY

Patented July 5, 1938

2,122,458

UNITED STATES PATENT OFFICE 2,122,458

FILM SPROCKET

Lloyd A. Elmer, Short Hills, N. J., assignor to Bell Telephone Laboratories, Incorporated, New York, N. Y., a corporation of New York Application June 30, 1936, Serial No. 88,128

5 Claims. (Cl. 271—2.3)

This invention relates to a film driving mechanism and more particularly to improvements in the design of film propelling sprockets employed in such film driving mechanism.

It is the object of this invention to provide a single film driving sprocket which will give uniform movement to two films, one a film of known minimum shrinkage and the other a film of known maximum shrinkage and will produce the best possible uniform movement of films having shrinkage values intermediate the known maximum and minimum shrinkages.

A feature of the invention lies in the provision of a film driving sprocket having a shoulder diameter such that pitch equality will be obtained with a film of minimum shrinkage and a sprocket tooth the working face of which conforms to a curve generated from a circle whose diameter is equal to the pitch diameter of a sprocket which would give pitch equality with the maximum shrunk film to be driven by the sprocket.

If sprocket tooth pitch equaled film perforation pitch at all times, the design of sprockets would be very simple as the contour of the working face of a sprocket tooth would be of little importance as long as it was inside a given maximum slope. However, it is well known that perforated film shrinks throughout its useful life in varied amounts. If the pitch of a perforated film bearing a photographic sound record differs from the fixed pitch of the driving sprocket, velocity variations will be produced in the film resulting in a perceptible change in the reproduced sound, recognized by a listener as harshness of sound. This disturbance or "flutter" can be detected in standard apparatus as a 96-cycle modulation of the reproduced signal, which is the rate of engagement or disengagement of the sprocket teeth and the film perforations. When a film having a pitch value below standard pitch is driven by a sprocket designed to give pitch equality with a film of standard pitch, the film will have to move backward with respect to the sprocket to engage the succeeding tooth or the film will climb out of engagement with the sprocket teeth. The contour of the working face of the sprocket tooth determines the character of the backward movement of the film and it is the velocity of this backward movement that determines the "flutter".

It is known that when a film having a pitch value below standard pitch is driven by a sprocket designed to give pitch equality with a film of standard pitch, the "leaving" tooth of the sprocket is the only one in engagement with a film perforation and therefore does all the film driving. It is also known that the "leaving" tooth is in engagement with a film perforation only during the rotation of the sprocket through one tooth angle.

If the pitch of a film matches exactly the pitch of a sprocket, the film will be driven forward uniformly at the velocity of the pitch circle of the sprocket. When a film having a pitch value smaller than the sprocket tooth pitch of the present standard film driving sprocket is driven by such sprocket, the film will move forward alternately at two velocities. For a portion of the rotation of the sprocket through one tooth angle, the velocity of the film will equal the velocity of the pitch circle of the sprocket minus the velocity of the backward movement of the film with respect to the sprocket as it strips from the driving tooth. This condition will exist until the film seats itself on the following sprocket tooth, after which the forward movement of the film for the remainder of the rotation of the sprocket through the tooth angle will be at the velocity of the pitch circle of the sprocket. The difference in these two forward velocities occurring during one tooth angle rotation of the sprocket determines the amplitude of the "flutter".

It is therefore evident that the contour of the working face of sprocket teeth becomes an important factor in the design of sound film driving sprockets.

As it is necessary that a sound film be driven past an exposure aperture at substantially uniform velocity regardless of the pitch of the film, it becomes exceedingly important that film driving sprockets be provided for sound film driving mechanisms which will propel a film with a minimum of variation in velocity.

Experience teaches that the pitch of standard film at the time it is used for sound recording purposes varies between .05 of 1% above standard pitch and .25 of 1% below. In re-recording work this range is between standard pitch and .3 of 1% below. In first-run theatres the shrinkage is between .2 and .8 of 1% below and in second-run theatres the range is between .2 and 1.5 of 1% below standard pitch.

Many manufacturers have made it standard practice to design the pitch of a sprocket for use in a particular sound film driving mechanism equal to the pitch of the maximum shrunk film to be handled by that machine. Other manufactures make the pitch of their sprocket equal the pitch of the minimum shrunk film to be handled by the particular machine in which the sprocket is to be used. Still other manufacturers choose to make their sprocket pitch such that it will equal the pitch of film in the middle of the range between the maximum and minimum shrunk film to be used in a particular machine.

It is standard practice to design the working face of the teeth of sprockets to be used in sound film driving machines to conform to the arc of a circle centered a few thousandths of an inch inside the sprocket shoulders and of short enough radius so that the arc will lie well within an involute curve generated about the sprocket shoulders as a base circle. This tooth contour is such that it allows a sudden backward movement of the film with respect to the sprocket soon after stripping action of the film on the driving tooth begins, thereby causing high relative velocity between the film and the sprocket shoulders and consequently, excessive flutter.

In accordance with applicant's invention a film driving sprocket is provided which will produce uniform flutter-free movement of two different films, one having the minimum shrinkage and the other having the maximum shrinkage of the range to be handled by the particular machine in which the sprocket is to be used. Films having shrinkage values intermediate the maximum and minimum values will be driven with the best possible uniform movement. The difference in the two forward velocities for a film of any intermediate shrinkage will always be the same and therefore the amplitude of the flutter will be the same for a film of any intermediate shrinkage.

Specifically, a sprocket designed in accordance with applicant's invention has a shoulder diameter to give pitch equality with a minimum shrunk film and sprocket teeth, the curved working faces of which are generated from a circle whose diameter equals the pitch diameter of a sprocket which would give pitch equality to the maximum shrunk film.

The contour of each tooth face is made to conform to a curve generated by the movement of a point in the film stripping path when this stripping path rolls without slipping on the generating circle. The contour of the curve so generated may take different forms depending upon whether the stripping path is a straight or curved line.

With a sprocket designed in accordance with this invention, the minimum shrunk film will be driven forward uniformly at the velocity of the pitch circle of the sprocket. A maximum shrunk film will be driven forward at a uniform velocity due to the fact that the film will have a uniform and uninterrupted backward movement with respect to the sprocket. At no time during the rotation of the sprocket through a single tooth angle will the maximum shrunk film be moved forward alternately at two velocities. Its velocity will always equal the velocity of the pitch circle of the sprocket minus the velocity of the backward movement of the film. The contour of the working face of the sprocket driving tooth is such that the film perforation of maximum shrunk film succeeding the driving perforation just seats itself on the succeeding sprocket tooth as the leaving tooth disengages from the film and, in addition, this succeeding film perforation will immediately begin to strip from the sprocket tooth just engaged. Due to this constant stripping action of the film from the driving tooth the maximum shrunk film has a uniform uninterrupted backward movement relative to the sprocket shoulders, resulting in a uniform forward velocity thereof.

An intermediate shrunk film will seat itself on the following tooth sooner than a maximum shrunk film and will therefore be moved forward first, at the velocity of the maximum shrunk film and then at the velocity of the minimum shrunk film. These two velocities will in general be nearer equal than the case for sprockets designed heretofore to give pitch equality with either the minimum or maximum shrunk film.

The invention may be more clearly understood by reference to the accompanying drawings in which Fig. 1 is a portion of a sound film reproducing machine as shown in perspective;

Fig. 4 is an enlarged view of a standard film driving sprocket shown in five separate positions during its rotation through a single tooth angle;

Fig. 5 is an enlarged view of a sprocket designed in accordance with this invention in five separate positions during its rotation through a single tooth angle.

Figure 1:
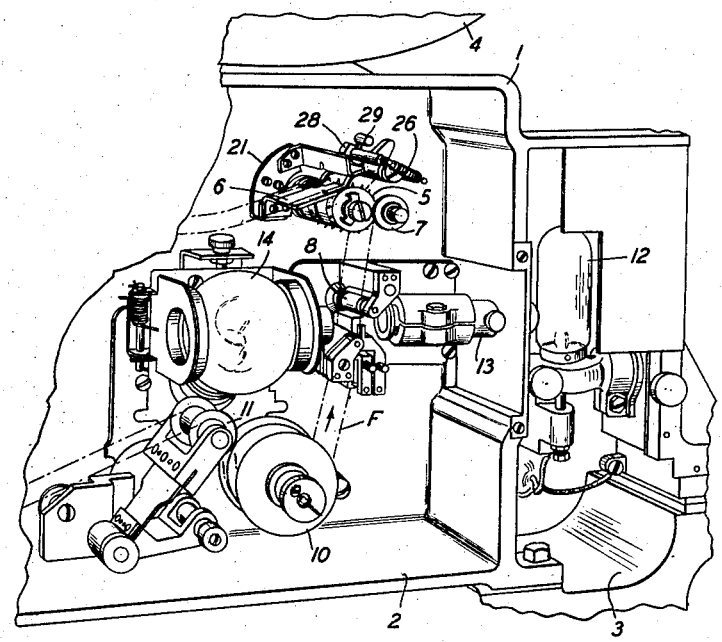

In Fig. 1 a sound film reproducing machine having a casing 1 is divided into two compartments 2 and 3. Film feed and take-up reels are mounted on top of casing 1, part of take-up reel housing 4 being shown. Compartment 2 contains a constant speed film driving sprocket 5, which has associated therewith a film stripper 6 and a pivoted film retaining roller 7. The guide roller assembly 8 guides a sound film F through a reproducing light beam in a right line. A tension roller 10 and associated film retaining roller 11 engage the film F preceding its engagement with the guide roller assembly 8. Compartment 3 contains an exciting lamp 12. A lens tube 13 extends through the compartment wall with one end adjacent the lamp 12 and the other end adjacent the film F. Light rays from the lamp 12 are projected to film F by lens tube 13. The film modulated light rays are projected by a further lens system to a reproducing photoelectric cell 14 mounted in compartment 2.

Figure 2:
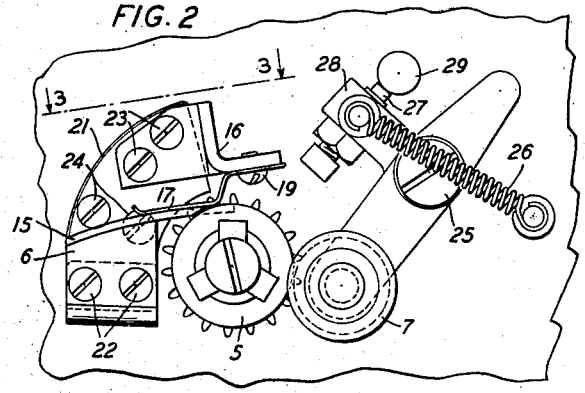
Fig. 2 is an enlarged view of the film driving sprocket and stripper assembly shown in Fig. 1.
Figure 3:
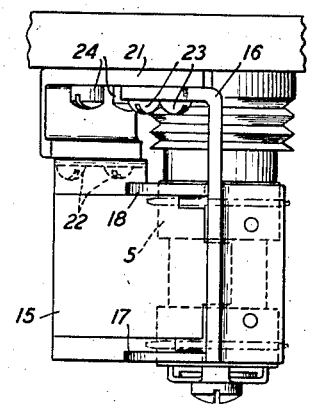
Fig. 3 is a view of the sprocket assembly taken through line 3—3 of Fig. 2.

It is well known that a sprocket will drive a particular film with greatest smoothness if the film is made to leave the sprocket in a given definite line, straight or slightly curved and tangent to a point on the sprocket shoulder. There is disclosed in detail in Figs. 2 and 3 a novel film stripper provided for this purpose.

This film stripper comprises a slightly curved film supporting plate 15, the reduced end portion of which extends into the space between the shoulders of the sprocket 5 tangent to a point on the sprocket shoulder. To an arm 16 there are secured two narrow light springs 17 and 18 by means of machine screws 19. These springs engage the film F on its marginal edges and exert just sufficient pressure to retain the film in contact with the film supporting plate 15. The plate 15 and arm 16 are secured to a supporting member 21 by means of machine screws 22 and 23, respectively. The supporting member 21 is secured to the inner side wall of compartment 2 by means of machine screws 24. The film retaining roller 7, pivoted at 25, is held in film engaging position by a coil spring 26. An adjustable member 27 mounted in arm 28 engages a stationary stop 29 to limit the movement of the film retaining roller toward the sprocket 5.

The Journal of the Society of Motion Picture Engineers for November 1934, page 271, sets forth the dimensions of a 35 mm. film feed sprocket adopted as standard by the Society of Motion Picture Engineers. No standard has been adopted for sound sprockets. It is common practice to employ in sound film driving mechanisms feed sprockets whose teeth are designed in accordance with the standard 35 mm. feed sprocket, as shown in the above-mentioned article.

It is known that the correct shoulder diameter for the standard sprocket is obtained by the following formula:

$$D_1 = D - t$$

Where
$D_1$ = sprocket shoulder diameter.
$D$ = diameter of circle formed by the mid-plane of the film when wrapped around the sprocket shoulder.
$t$ = thickness of the film (normally .006 inch).

The pitch circle diameter D is obtained by the following formula:

$$D = \frac{P(1-s'')N}{\pi}$$

Where
$P$ = standard 35 mm. film pitch (.187 inch).
$s''$ = shrinkage value of film to be given pitch equality.
$N$ = number of teeth in sprocket.

The standard feed sprocket as shown in the above-mentioned Journal of the Society of Motion Picture Engineers is designed to give pitch equality with a film shrunk .13 of 1% from the standard pitch of .187 inch. The term, $s''$, therefore, in the above equation for the diameter of the pitch circle of the standard sprocket is .0013.

The working face of the sprocket teeth of the standard sprocket is made to conform to the arc of a circle centered .004 inch ± .002 inch below the sprocket shoulder and having a radius of .077 inch. A film having a shrinkage value of .13 of 1% below standard pitch will be driven by the standard sprocket with a uniform flutter-free forward motion as represented by curve A of Fig. 6.

An enlarged view of a standard film feed sprocket is shown in Fig. 4. This figure is presented to facilitate a description of the action of a film having a shrinkage greater than that for which the standard sprocket is designed when such film is driven by the standard sprocket. In this figure the relative dimensions for a standard sprocket have been retained and the film F driven thereby has a shrinkage value of 1.5 of 1% below standard pitch, while, as mentioned above, the sprocket is designed to give pitch equality to a film having a shrinkage value of .13 of 1% below standard pitch. The figure shows five steps in the rotation of the sprocket through a single tooth angle.

In the separate steps shown in Fig. 4 the film F is shown leaving the sprocket in a straight line tangent to a point on the sprocket shoulder. A vertical line X—X intersects each step as shown in this figure at the point the film leaves the sprocket shoulder and which, it will be seen, is the point at which the film begins to strip from the sprocket driving tooth.

Assuming the sprocket in Fig. 4 to be rotating in the direction of arrow Z, the tooth 30 in step I is the only tooth in engagement with the film X. This engagement is at the point $x$, which is the point the film commences to strip from tooth 30. In step II the tooth 30 has advanced, driving the film F forward while the film itself has been stripping from this tooth, with a resultant backward movement relative to the sprocket shoulder. Step III represents the point at which, during the rotation of tooth 30 through a single tooth angle, the succeeding tooth 31 just engages the succeeding perforation of the film. The tooth 30 from this point disengages from the film F and the tooth 31, which has just engaged the film, drives it forward at the velocity of the pitch circle of the sprocket from $y$ to $x'$ during the remainder of the single tooth angle rotation, or until this tooth 31 reaches the stripping point $x'$, as shown in step V.

Figure 6:
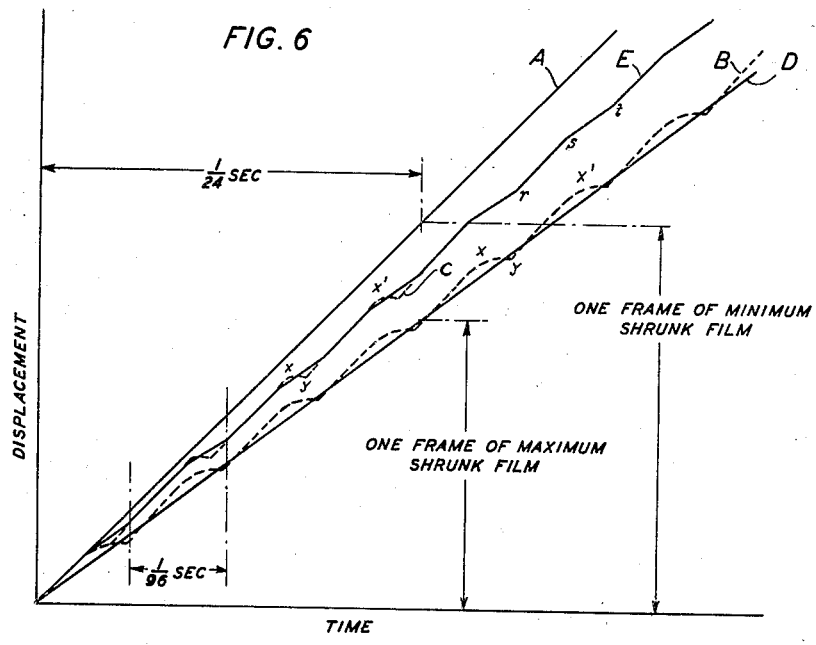
Fig. 6 shows time-displacement curves for a film of a definite, known shrinkage driven by the sprockets of Figs. 4 and 5.

Referring to Fig. 6, curve B and step III of Fig. 4, the portion of curve B from $x$ to $y$ represents the velocity of the forward movement of the film during the stripping of the film from the driving tooth 30. In Figs. 4 and 6, $y$ represents the point at which stripping ceases or at which the following tooth 31 of Fig. 4 engages the succeeding film perforation. From the point $y$ to the point $x'$, or for the remainder of the rotation of the tooth 30 through a single tooth angle, the film is driven forward by tooth 31 at the velocity of the pitch circle of the sprocket, which, it will be noted, is the same as the velocity indicated by curve A, Fig. 6.

It is evident from this description that there is a great difference between the two forward film velocities, $x$ to $y$ and $y$ to $x'$, during a single tooth angle rotation of the sprocket. From the foregoing description it becomes obvious that excessive flutter is introduced into a film having a maximum shrinkage in a particular range of shrinkages when it is driven by a sprocket designed to give pitch equality with a film having the minimum shrinkage in the particular range.

Curve C of Fig. 6 shows the variations in forward velocity of a film having a shrinkage value intermediate the minimum shrinkage of .13 of 1% below standard and the maximum of 1.5 of 1% below standard, when driven by the standard sprocket designed to give pitch equality to a film having the minimum shrinkage value of .13 of 1%. It will be observed that the duration of the forward movement of the film at the pitch circle velocity becomes greater and that the difference in the two forward velocities of the film becomes smaller as the pitch of the film approaches the film pitch for which the sprocket is designed. It is evident, therefore, that when a standard feed sprocket is used, as is the present practice, for driving a sound film, greater flutter will be produced in the film the further the pitch of the film departs from the film pitch for which the sprocket is designed.

As mentioned previously in this specification, experience teaches that the minimum and maximum shrinkages likely to be encountered in a particular machine may be fairly definitely established.

In accordance with applicant's invention there is provided a single sprocket which will give uniform flutter-free forward motion to a film having a predetermined maximum shrinkage as well as a film having a predetermined minimum shrinkage in a particular range of shrinkages.

In accordance with the invention the shoulder diameter of the sprocket is obtained in the same manner and by the same formula as used heretofore, to give pitch equality with a film of minimum shrinkage.

The working face of the sprocket tooth in accordance with applicant's invention is a curve generated from a circle, the diameter of which is obtained by the following formula.

$$D_0 = \frac{P(1-s)N}{\pi}$$

Where

P = pitch of standard film (.187 inch)
s = shrinkage value of the maximum shrunk film
N = number of teeth in sprocket.

Referring to Fig. 5, an enlarged view of a sprocket designed in accordance with the invention is shown in five separate steps during the rotation of the sprocket through a single tooth angle. In this disclosure the sprocket shoulder diameter $D_1$ is the same as the shoulder diameter of the sprocket shown in Fig. 4. Therefore, pitch equality will be given by this sprocket to a film shrunk .13 of 1% from standard pitch, the same as the sprocket in Fig. 4. The film F in Fig. 5 has the same shrinkage value (1.5 of 1%) as the film F in Fig. 4. In this manner I may compare the action of a particular maximum shrunk film when driven by a standard prior-art sprocket of Fig. 4 with the action of the same film when driven by the sprocket of Fig. 5 designed in accordance with this invention.

Figure 7:
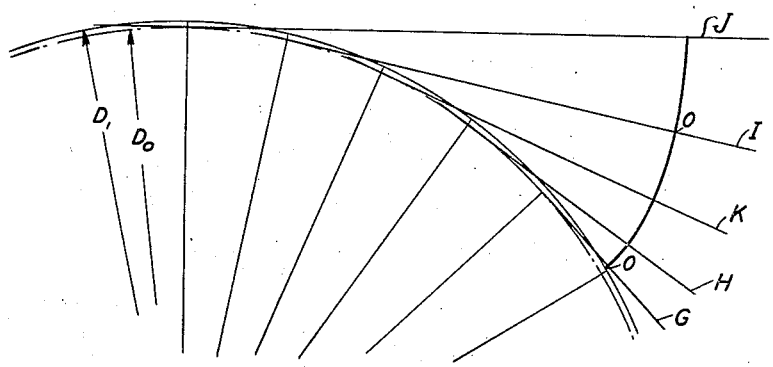
Fig. 7 illustrates the method of generating the working face of a sprocket tooth when the film leaves the sprocket shoulder in a straight line tangent to the sprocket shoulder.
Figure 8:
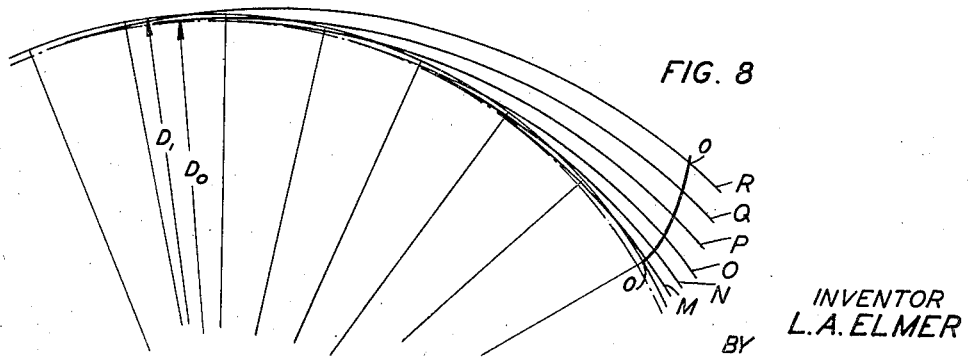
Fig. 8 illustrates the method of generating the working face of a sprocket tooth when the film leaves the sprocket in a curved path tangent to the sprocket shoulder.

The working face of each tooth of the sprocket of Fig. 5 conforms to an involute generated from circle $D_0$. As stated earlier in this specification the contour of the driving face of each tooth conforms to a curve generated by a point in the film stripping path as this point rolls, without slipping, on the generating circle $D_0$. In Fig. 5 the film F leaves the sprocket in a straight line tangent to a point on the sprocket shoulder. The movement of a point in a straight line tangent to circle $D_0$ as this tangent rolls, without slipping, on the circle $D_0$ will generate an involute curve. Referring to Fig. 7, the lines G, H, K, I and J represent successive positions of the stripping line, which is a straight line tangent to $D_0$ as this stripping line rolls, without slipping, on the circle $D_0$. A point 0 on the tangent stripping line G will generate an involute as the stripping line rolls, without slipping, to successive positions H, K, I and J on the circle $D_0$. If the film strips from the sprocket shoulders in a curved path tangent to a point on the sprocket shoulder, the contour of the working face of the driving teeth in accordance with this invention will conform to a curve differing slightly from the involute curve shown in Fig. 7. The contour of the working face of each sprocket tooth designed for driving a film assuming a curved strip path will conform to a trochoidal curve generated by a point in the curved stripping path as this stripping path rolls, without slipping, on the base circle $D_0$. Referring to Fig. 8, the curved stripping path M assumes successive positions N, O, P, Q and R. A point 0 on stripping path L generates a trochoidal curve as the stripping path assumes positions M, N, O, P, Q and R in rolling on circle $D_0$.

If a film assumes a stripping path in a curve away from the sprocket shoulder, the contour of the face of each sprocket tooth will conform to a trochoidal curve of different shape.

Referring again to Fig. 5 the line X—X intersects the sprocket at the point the film leaves the sprocket shoulder, which is the point at which this film begins to strip from the driving tooth. The sprocket rotates in the direction of arrow Z.

A sprocket tooth 32 in step I is shown in engagement with the film F at the line X—X. In steps II, III and IV the film F is being stripped from driving tooth 32 along the involute driving face thereof. The film perforation succeeding the driving perforation does not engage the follow tooth 33 until this tooth reaches the line X—X as shown in step V. The film at this point immediately begins stripping from tooth 33. It will be seen, therefore, that there is no forward movement of the film at the velocity of the pitch circle of the sprocket corresponding to the film velocity from $y$ to $x'$ in Fig. 4. There is an even uninterrupted backward movement of the film relative to the sprocket shoulder. The velocity of the film at all times during the rotation of the sprocket through a single tooth angle is equal to the velocity of the pitch circle of the sprocket minus the velocity of the backward movement of the film with respect to the sprocket shoulder.

Curve D of Fig. 6 represents the velocity of the film F when driven by the sprocket shown in Fig. 5. It will be seen that the sprocket of Fig. 5 will produce uniform flutter-free forward motion of two films, one having the minimum shrinkage value and the other having the maximum shrinkage value in a particular range of shrinkages likely to be encountered in a particular machine. The sprocket shoulder diameter for a particular sprocket is designed to give pitch equality to the film of minimum shrinkage to produce the flutter-free forward movement thereof, as indicated by curve A, Fig. 6, and the working face of the sprocket teeth is designed to conform to an involute curve generated about a circle the diameter of which is obtained by the formula given in accordance with applicant's invention to produce a uniform flutter-free forward velocity of a film having a minimum shrinkage, as indicated by curve D.

Curve E represents the velocity of a film having a shrinkage value intermediate the minimum and maximum values when driven by the sprocket disclosed in Fig. 5. The film moves forward first at the velocity of the minimum shrunk film, curve A, from $r$ to $s$, and then at the velocity of the maximum shrunk film, curve D, from $s$ to $t$. As these two velocities are nearer equal than the two velocities of curve C, the flutter produced in an intermediate shrunk film by the sprocket of Fig. 5 will be considerably less than that produced in the same film by the sprocket of Fig. 4.

From a consideration of the above description, it becomes clear that a sprocket in Fig. 5 designed in accordance with applicant's invention is given a pitch circle diameter $D_1$ to produce pitch match between the sprocket and a minimum shrunk film and is provided with teeth having involute working faces generated from a circle having a diameter $D_0$ which, if taken as the pitch circle of a separate sprocket, the separate sprocket would give pitch equality with the maximum shrunk film F.

The pitch of the minimum shrunk film to be driven by the sprocket of Fig. 5 will match the tooth pitch of the sprocket when the minimum shrunk film is wrapped around the sprocket shoulders. The contour of the working face of each tooth designed in accordance with this invention will produce pitch equality with the portion of the maximum shrunk film F in the stripping line. In Fig. 5 step I, teeth 32 and 40 engage the film F in the stripping line. As long as both these teeth engage the film in this stripping line, they will give pitch equality with the maximum shrunk film F. When a sprocket is used having a greater number of teeth than the sprocket in Fig. 5, three or four teeth may engage the film in the stripping path. In such cases pitch equality will be obtained with maximum shrunk film by all the teeth in engagement with this film in the stripping path.

What is claimed is:

1. A film sprocket for film propelling machines provided with teeth having curved driving faces generated from a circle whose diameter is $$D_0 = \frac{P(1-s)N}{\pi}$$

2. A film driving sprocket for film propelling mechanisms having a pitch circle whose diameter is $$D = \frac{P(1-s'')N}{\pi}$$

and teeth having driving faces conforming to a curve generated from a circle whose diameter is $$D_0 = \frac{P(1-s)N}{\pi}$$

3. A toothed film driving sprocket having a tooth pitch equal to the perforation pitch of one film to be driven thereby, and teeth having trochoidal driving faces generated from a base circle the diameter of which is equal to the pitch diameter of a sprocket giving pitch equality with a reduced perforation pitch film to be driven by said sprocket.

4. A film sprocket for film propelling mechanisms having a tooth pitch giving pitch equality with the minimum shrunk film to be driven thereby, and teeth having driving face contours conforming to a trochoidal curve giving pitch equality with the maximum shrunk film to be driven thereby in the path of the film leaving the sprocket from a point tangent to the sprocket shoulder.

5. A film sprocket for film propelling machines having teeth provided with involute driving faces generated from a base circle whose diameter is $$D_0 = \frac{P(1-s)N}{\pi}$$

LLOYD A. ELMER.